Nov. 18, 1924.

Re. 15,948

H P. SIMONDS

ELECTRIC DROPLIGHT SHADE

Original Filed Feb. 6, 1923

Inventor
Harry P. Simonds

Witness:
E. H. Wagner.

By Robb & Robb & Hill
Attorneys

Reissued Nov. 18, 1924. Re. 15,948

UNITED STATES PATENT OFFICE.

HARRY P. SIMONDS, OF WASHINGTON, DISTRICT OF COLUMBIA.

ELECTRIC DROPLIGHT SHADE.

Original No. 1,494,193, dated May 13, 1924, Serial No. 617,414, filed February 6, 1923. Application for reissue filed June 3, 1924. Serial No. 717,668.

*To all whom it may concern:*

Be it known that I, HARRY P. SIMONDS, a citizen of the United States, residing at Washington, in the District of Columbia, have invented certain new and useful Improvements in Electric Droplight Shades, of which the following is a specification.

My invention relates to improvements in shade holders or supports and is intended to be used on such lamp fixtures as will permit of a shade being readily placed thereon by a quick detachable connection, and is particularly applicable to electric droplights in common use which have a cord with a socket at its lower end for engagement with the electric bulb or to other lights mounted so that the shade may be similarly applied.

One object in view is to provide a shade with a holder or supporting member of this character which may be easily placed upon the lamp or removed therefrom without disturbing any of the parts of the lamp or having to change any of them relatively to each other. Another object is to provide a device of this character which can be easily adjusted with respect to the lamp to throw the light to any desired part of the room while at the same time shading the rest of the room.

Speaking in general terms my invention consists of a vertically disposed semi-spherical shade having at its upper side a socket receiving support adapted to be rotatably mounted on the electric light socket around the supporting cord, said support having a longitudinal slot in one side thereof leading into the center of the support for the reception thereinto of the drop light cord, said support also having transverse slots at opposite sides of the longitudinal slot and leading out therefrom to receive the stem of the switch-key of the lamp socket and to adapt the support to be rotated on the socket either toward the right or left without contacting with said key.

The invention consists in the novel construction and arrangement of the several parts as hereinafter described and claimed, reference being had to the accompanying drawing, in which:—

Figure 1:
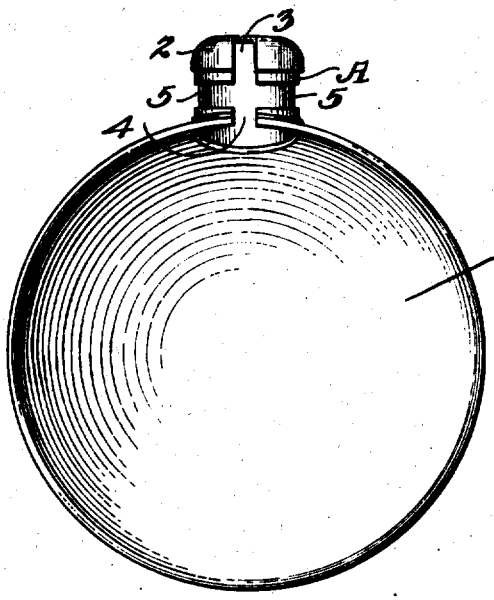
Figure 2:
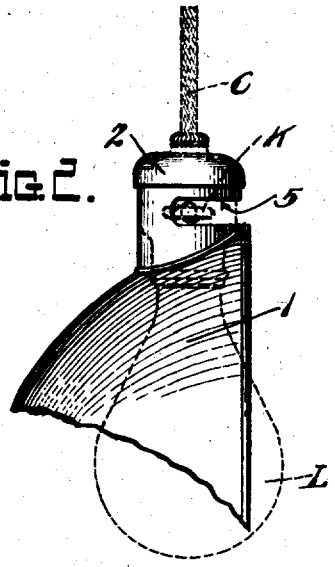
Figure 3:
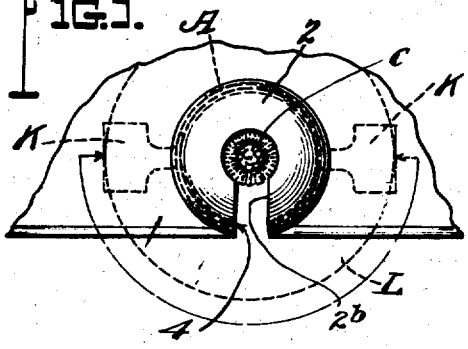
Figure 4:
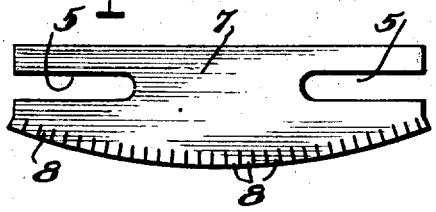
Figure 5:
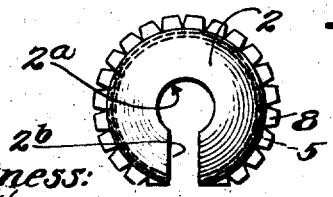

Fig. 1 is a front view of a shade embodying my improvements. Fig. 2 is a side elevation, (partly broken away,) showing my improved shade in position on a drop cord, the lamp and cord being shown in dotted lines. Fig. 3 is a broken top plan view of a shade made in accordance with my invention, as shown applied in Fig. 2. Fig. 4 is a plan view of the blank from which the body of my supporting member is formed; and Fig. 5 is a top plan view of the supporting member before the same is secured to the shade proper.

The numeral 1 indicates a lamp shade or reflector of well known form, usually made of metal. Attached to the shade at the upper side thereof is a sleeve-like supporting member A having a dome-shaped closure cap 2 rigidly secured thereon. This supporting member is adapted to fit over an electric lamp socket of the usual type used in connection with incandescent electric lamps. The dome-shaped cap 2 has a central opening $2^a$ and a slot $2^b$ leading out therefrom through the front side of the cap. The member A has in its front side a longitudinal slot 3 which joins the slot $2^b$ of the cap; and the margin of the shade proper is cut away at 4 to form an opening registering with the slot 3. Leading out transversely from the slot 3 on opposite sides thereof are the slots 5 for the reception of the switch-key K of the socket and to permit said supporting member A to be rotated in either direction on the socket without contacting with said key.

In placing my improved shade in operative position on a lamp, the cord of the lamp L just above the socket is passed laterally into the longitudinal slot 3 of the supporting member A until the hole $2^a$ at the center of the cap of said supporting member is reached. The supporting member is then moved downwardly and is rotated into position to permit the key K to pass up through the cut away portion 4 into position to be received into the transverse slots 5 when the shade is rotated relative to the socket. When this position is reached the dome-shaped cap 2 of the supporting member will be resting on the upper end of the lamp socket upon which the slots 5 permit it to be rotated freely to cause the shade to face toward any desired part of the room, to flood that part with light while shading the rest of the room. Since the socket is now received into the supporting member A, the latter is positively held in operative position on the lamp, and though it may be freely rotated thereon, it cannot be removed therefrom until it is again elevated sufficiently to pass the key K out of the vertical slot 3 and opening 4 and clear the socket.

The member A is preferably formed of a piece of sheet metal (as shown in Fig. 4) bent into the desired form with its dome-shaped cap 2 rigidly secured thereon in any desired manner, as for instance, by soldering, or said member may be stamped as an integral construction from sheet metal.

The blank 7 illustrated in Fig. 4 has its lower edge provided with a number of short spaced cuts forming teeth 8, as it were, on the edge of the member; and these teeth are shown in Figure 5 as being bent outwardly at right angles to the main body of the member to form a broken flange around the lower end thereof, whereby to provide a more convenient means for rigidly securing the lower end of the member A to the shade, either by soldering or otherwise. Of course, the toothed flange may be omitted if desired, as the two parts can be soldered together without it.

Having thus described my invention, what I claim as new is:—

1. A shade holder of the class described having a body formed to receive and engage about a lamp socket provided with a switch key, said body having a slot in its side wall to permit the introduction of the lamp cord by sidewise movement of the body, and means on the body laterally of the slot and disposed to receive said switch key to permit rotative movement of the holder upon the socket.

2. A shade holder of the class described having a body formed to enclose a lamp socket having a switch key and provided in its side wall with intersecting slots, one of which is disposed to permit passage of the holder over a lamp cord by a sidewise movement and the other to receive said key and permit rotative movement of the holder relative thereto.

3. A lamp shade device of the class described for application to light sockets, comprising a shade, a sleeve-like socket receiving portion connected thereto and having a longitudinal cord receiving slot opening through the side thereof, and a key receiving slot extending transversely of the cord receiving slot to a sufficient extent to permit rotative and interlocking mounting and for supporting the device upon the light socket.

4. A lamp shade holder for sustaining a shade upon a drop light socket comprising a sleeve-like supporting member having a closure cap at one end, said member having a slot through the side thereof extending into the cap through which the light cord may pass by a relative lateral movement, and an intersecting key receiving slot to permit of rotation of the sleeve about the light socket for adjustment of the shade.

5. A combined shade and holder for electric lamps comprising a substantially tubular portion formed with a longitudinal slot and provided at one end with a supporting cap adapted to rest upon a lamp socket, and a shade member carried by said tubular portion and having a passage extending from its open face into communicating alignment with said longitudinal slot, thereby permitting application of the holder and shade as a unit to the lamp socket by side and endwise movement into encircling sustaining engagement of the holder thereon.

In testimony whereof I affix my signature.

HARRY P. SIMONDS.